United States Patent
Joyce et al.

Patent Number: 5,740,538
Date of Patent: Apr. 14, 1998

[54] SYSTEM AND METHOD FOR IDENTIFYING THE LOCATION OF A WIRELESS TERMINAL

[75] Inventors: Michael Julian Joyce, Blackburn South, Australia; Ping-Wen Ong, Middletown, N.J.; Abbas Ourmazd, Frankfurt, Germany; Colin Alan Warwick, Holmdel, N.J.

[73] Assignee: Lucent Technologies, Inc., Murray Hill, N.J.

[21] Appl. No.: 583,355

[22] Filed: Jan. 5, 1996

[51] Int. Cl.⁶ .................................................. H04Q 7/20
[52] U.S. Cl. ................................. 455/456; 455/415
[58] Field of Search .............................. 379/58, 59, 61, 379/63, 127, 142; 455/456, 457, 435, 422, 415

[56] References Cited

U.S. PATENT DOCUMENTS

| | | | |
|---|---|---|---|
| 4,748,655 | 5/1988 | Thrower et al. | 379/58 X |
| 5,371,781 | 12/1994 | Ardon | 379/59 |
| 5,388,147 | 2/1995 | Grimes | 379/59 |
| 5,519,760 | 5/1996 | Borkowski et al. | 379/59 |
| 5,544,225 | 8/1996 | Kennedy, III et al. | 379/59 |
| 5,548,583 | 8/1996 | Bustamente | 379/63 X |
| 5,561,704 | 10/1996 | Salimando | 379/58 |
| 5,596,625 | 1/1997 | LeBlanc | 379/58 |

OTHER PUBLICATIONS

Cellular One Testing '911' System in New York, Mobile Phone News, Jun. 26, 1995, p. 4.

Primary Examiner—Dwayne Bost
Assistant Examiner—William G. Trost

[57] ABSTRACT

A system and method that identify the location of a wireless terminal. An illustrative embodiment of the present invention comprises a wireless communication system with a plurality of base stations. The system associates a location identification signal with each base station, such as an area code and an exchange of a telephone number in the geographic area of the base station. When a call is connected through a base station, the system modifies the caller-ID signal for the wireless terminal with the location identification signal of the base station. Thus, the system identifies the location of a wireless terminal.

9 Claims, 1 Drawing Sheet

SYSTEM AND METHOD FOR IDENTIFYING THE LOCATION OF A WIRELESS TERMINAL

FIELD OF THE INVENTION

This invention relates in general to the field of communications and, more particularly, to a system and method for identifying the location of a wireless terminal.

BACKGROUND OF THE INVENTION

Some organizations provide services or information to a user based on the location of the user. For purposes of this specification, these organizations are referred to collectively as "location based services" or "services." For example, one location based service provides current weather information to users over the telephone network. To provide the user with the appropriate weather information, the service must know the location of the user. Typically, such services use the caller-ID service provided by the telephone network to determine the location of the user. For example, the area code and exchange of a telephone number can provide the service with the location of a wireline telephone. Based on this location information, a service can give the user accurate information on, for example, the current weather, location of a restaurant or other location based service.

Typically, wireless terminals operate throughout a large geographic area. As with conventional wireline terminals, wireless terminals have telephone numbers. However, unlike wireline terminals, these telephone number do not indicate the geographic location of the user of the wireless terminal. Thus, a location based service cannot accurately provide services or information to a user of a wireless terminal based on the telephone number of the wireless terminal.

The telecommunications industry, in collaboration with various government agencies, has begun to develop elaborate systems that identify the location of wireless terminals to assist emergency personnel in responding to traffic accidents. Such systems use, for example, global positioning system (GPS) receivers in combination with wireless terminals to provide officials with the location of an accident. The GPS receiver provides both latitude and longitude data that is accurate, in some locations, to within a few meters. Unfortunately, the cost of GPS receivers may prove prohibitive to commercial realization of these systems for consumer use. Additionally, many services do not require the precision provided by a GPS receiver.

SUMMARY OF THE INVENTION

Embodiments of the present invention can identifying the proximate location of a wireless terminal without the costs and disadvantages associated with previously developed systems and methods. Specifically, an illustrative embodiment of the present invention comprises a wireless communication system with a plurality of base stations. The system associates a location identification signal with each base station. For example, the location identification signal may comprise a six digit number representing the area code and exchange for the geographic location of the base station. When a call is connected through a base station, the system modifies the caller-ID signal for the wireless terminal with the location identification signal of the base station. The system may substitute the location identification signal for the caller-ID signal. Alternatively, the system may append the location identification signal to the caller-ID signal. Thus, the system identifies the proximate location of a wireless terminal.

BRIEF DESCRIPTION OF THE DRAWING

For a more complete understanding of the present invention and the advantages thereof, reference is now made to the following description taken in conjunction with the accompanying drawings in which like reference numbers indicate like features and wherein.

DETAILED DESCRIPTION

Figure 1:
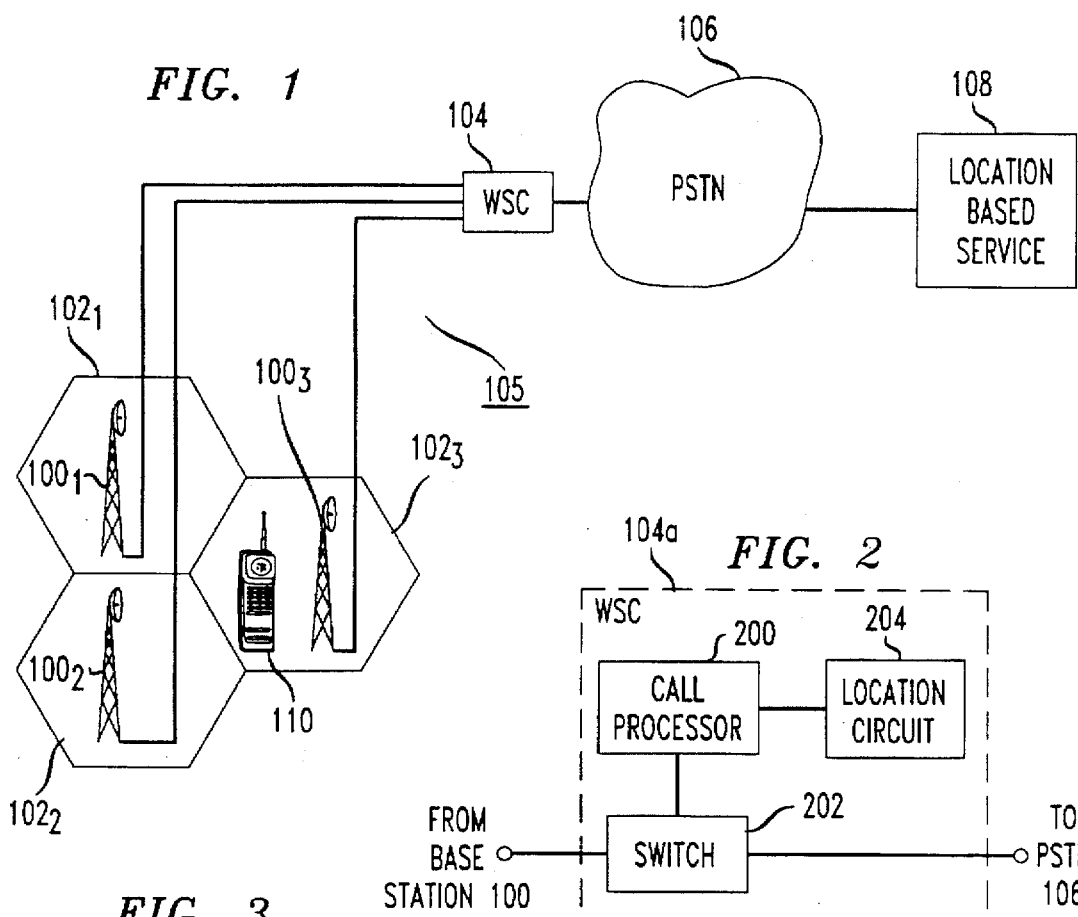
FIG. 1 depicts a block diagram of an illustrative embodiment of a communications system constructed according to the teachings of the present invention.

FIG. 1 depicts a block diagram of an illustrative embodiment of the present invention. In this embodiment, base stations $100_1$, $100_2$ and $100_3$ are disposed throughout a geographic area that is partitioned into a number of spatially distinct regions $102_1$, $102_2$ and $102_3$ called "cells." As depicted in FIG. 1, each cell $102_n$ is represented by a hexagon; in practice, however, each cell $102_n$ usually has an irregular shape that depends on the topography of the terrain and other factors. Base stations $100_n$ are coupled to a wireless switching center ("WSC") 104. Base stations $100_n$ and WSC 104 form a wireless communication system 105 that can generate a signal that identifies the "proximate location" of wireless terminal 110 that is precise to within, for example, the size of an average cell $102_n$. WSC 104 and location based service 108 are coupled to public switched telephone network ("PSTN") 106. Location based service 108 uses the signal transmitted from PSTN 106, e.g., the caller-identification ("caller-ID") signal, to provide a service to wireless terminal 110. For example, location based service provider 108 may provide weather information to callers based on the location of the caller.

In operation, wireless communication system 105 can identify the proximate location of wireless terminal 110 to location based service 108 even though wireless terminal 110 is not fixed in a specific location. Wireless terminal 110 initiates a call to location based service 108 from, for example, cell $102_2$. Base station $100_2$ connects the call to location based service 108 through WSC 104 and PSTN 106. Wireless communication system 105 modifies the caller-ID signal for wireless terminal 110 with a signal that identifies the location of base station $100_2$. For example, system 105 can replace at least a portion of the caller-ID signal with a three digit area code and a three digit exchange number corresponding to the location of base station $100_2$. Alternatively, system 105 can append a signal to the caller-ID signal that identifies the location of base station $100_2$.

Figure 2:
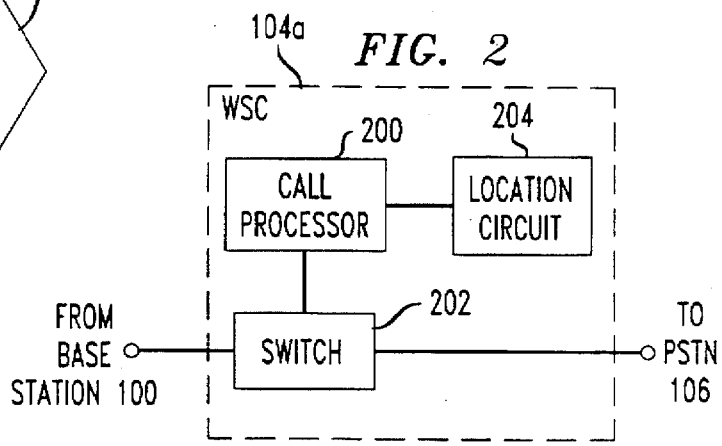
FIG. 2 depicts a block diagram of an embodiment of a wireless switching center for use in the system of FIG. 1.

FIG. 2 depicts a block diagram of an embodiment of wireless switching center ("WSC") 104a for use in system 105 of FIG. 1. WSC 104a comprises switch 202 that routes or couples calls between base stations $100_n$ and PSTN 106. Call processor 200 controls switch 202. Location circuit 204 is coupled to call processor 200.

In operation, WSC 104a modifies the caller-ID signal for wireless terminal 110. Base station $100_n$ signals WSC 104a to connect a call to PSTN 106. Call processor 200 directs switch 202 to connect base station $100_n$ to PSTN 106.

Location circuit 204 determines whether wireless terminal 110 placed the call to a location based service 108. When the call is placed to a location based service 108, location circuit 204 modifies the caller-ID signal with a location identification signal that reflects the location of base station $100_n$.

Figure 3:
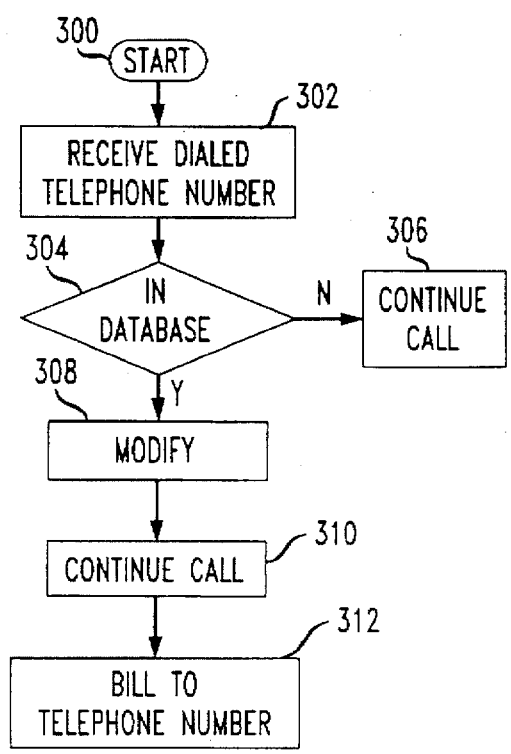
FIG. 3 depicts a flowchart illustrating an illustrative embodiment of a method for identifying the location of a wireless terminal in a wireless communications system.

FIG. 3 depicts a flow chart of an illustrative embodiment of the present invention. The method begins at block 300. At block 302, a wireless terminal initiates a call by sending a telephone number. A wireless communications system receives the number and, at block 304, decides whether the number is for a location based service. For example, the system can search a database for the number. When the answer is no, the method proceeds to block 306 and continues the call without modifying the caller-ID signal for the wireless terminal. When, however, the answer is yes, the method proceeds to block 308. At block 308, the method modifies the caller-ID signal. For example, the method can substitute a location identification signal for the base station processing the call in place of some or all of the caller-ID signal. Alternatively, the method can append a location identification signal on to the caller-ID signal. At block 310, the method continues the call to a location based service using the modified caller-ID. At block 312, the method bills the user of the wireless terminal for the call.

Although embodiments of the present invention have been described in detail, it is understood that various changes, alterations and substitutions can be made hereto without departing from the spirit and scope of the present invention as defined by the appended claims. For example, the caller-ID signal can be modified in the base station rather than in the WSC. Furthermore, the system could use a coded signal other than an area code and an exchange, such as latitude and longitude, to represent the location of the base station. Use of such a coded signal would remove the need for the location based services to update their services when new area codes and exchanges are introduced by the telephone companies. A further modification would be that the system may identify just the WSC that the call is associated with, rather than the base station.

What is claimed is:

1. A wireless communication system comprising:

a wireless switching center coupled to a public switched telephone network;

a plurality of base stations communicatively coupled to said wireless switching center; and a location circuit that determines if a called number corresponds to a location service and if said called number corresponds to the location service, said location circuit modifies the caller-identification signal for a call from a wireless terminal with a signal that identifies the location of one of said base stations such that the modified caller-identification signal identifies the proximate location of the wireless terminal.

2. The system of claim 1, wherein said location circuit is disposed in said base station.

3. The system of claim 1, wherein said location circuit is disposed in said wireless switching center.

4. The system of claim 1, wherein said location circuit comprises a circuit that replaces at least a portion of the caller-identification signal with a three digit area code and a three digit exchange number corresponding to the location of the base station.

5. The system of claim 1, wherein said location circuit comprises a circuit that appends a location signal to said caller-identification signal.

6. A method for identifying the location of a wireless terminal, the method comprising:

receiving a dialed telephone number from a wireless terminal at a base station;

determining if a called number corresponds to a location service and if said called number corresponds to the location service, said location circuit modifying the caller-identification signal for a call from a wireless terminal with a signal that identifies the geographic location of the base station such that the modified caller-identification signal identifies the proximate location of the wireless terminal;

continuing the call with the modified caller-identification signal.

7. The method of claim 6, wherein said step of modifying the caller-identification signal comprises the step of appending a location signal to the caller identification signal.

8. The method of claim 6, wherein said step of modifying the caller-identification signal comprises the step of replacing the caller identification signal with a location identification signal.

9. The method of claim 6, wherein said step of modifying the caller-identification signal comprises the step of replacing at least a portion of the caller-identification signal with a three digit area code and a three digit exchange corresponding to the location of the base station.

\* \* \* \* \*